United States Patent
Willacker et al.

(10) Patent No.: US 12,212,204 B2
(45) Date of Patent: Jan. 28, 2025

(54) WIRING CONFIGURATION FOR A STATOR, TEMPERATURE SENSOR DEVICE, AND SYSTEM FOR DETECTING A TEMPERATURE

(71) Applicant: ZF Friedrichshafen AG, Friedrichshafen (DE)

(72) Inventors: Katja Willacker, Wiesentheid (DE); Christian Brückner, Rimpar (DE); Daniel Schmitt, Bad Bocklet (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 510 days.

(21) Appl. No.: 17/435,795

(22) PCT Filed: Mar. 3, 2020

(86) PCT No.: PCT/EP2020/055571
§ 371 (c)(1),
(2) Date: Sep. 2, 2021

(87) PCT Pub. No.: WO2020/178290
PCT Pub. Date: Sep. 10, 2020

(65) Prior Publication Data
US 2022/0149691 A1    May 12, 2022

(30) Foreign Application Priority Data
Mar. 5, 2019 (DE) .......................... 102019202912.4

(51) Int. Cl.
*H02K 11/25* (2016.01)
*H02K 3/50* (2006.01)

(52) U.S. Cl.
CPC .............. *H02K 3/50* (2013.01); *H02K 11/25* (2016.01); *H02K 2203/09* (2013.01)

(58) Field of Classification Search
CPC ....... H02K 11/25; H02K 3/50; H02K 2203/09
(Continued)

(56) References Cited

U.S. PATENT DOCUMENTS 9,143,021 B2 *   9/2015  Haruno ................. H02K 11/25
10,020,708 B2 *  7/2018  Le Douarin ............ H02K 3/28
(Continued)

FOREIGN PATENT DOCUMENTS

CN     203522446 U     4/2014
CN     203942360 U    11/2014
(Continued)

OTHER PUBLICATIONS

Machine Translation, FR 3046505 Ben-Omrane et al. (Year: 2017).*
(Continued)

*Primary Examiner* — Burton S Mullins
(74) *Attorney, Agent, or Firm* — Kristin L. Murphy

(57) ABSTRACT

The disclosure relates to a wiring configuration for a stator of an electric machine. The wiring configuration comprises a busbar which forms a segment of a switching ring with an outer connection and a winding connection. Outer connection elements and winding connection elements are arranged in a wiring region. The wiring configuration additionally comprises a receiving element which is at least thermally coupled to the busbar. The receiving element is arranged outside of the wiring region. The disclosure additionally relates to a temperature sensor device for plugging onto the receiving element of the wiring configuration and to a system for detecting the temperature of a stator.

17 Claims, 6 Drawing Sheets

(58) Field of Classification Search
USPC .......................................................... 310/71
See application file for complete search history.

(56) References Cited

U.S. PATENT DOCUMENTS

| | | | |
|---|---|---|---|
| 10,263,484 B2 * | 4/2019 | Mizutani | .................. H02K 3/12 |
| 10,436,648 B2 * | 10/2019 | Yoshihara | ................. G01K 1/16 |
| 10,547,228 B2 * | 1/2020 | Kong | ....................... H02K 3/28 |
| 11,892,358 B2 * | 2/2024 | Yoshihara | .............. G01K 1/143 |
| 2012/0111145 A1 | 5/2012 | Maekawa et al. | |
| 2013/0270937 A1 | 10/2013 | Rasmussen | |
| 2013/0270973 A1 * | 10/2013 | Ikemoto | ................. H02K 11/25 |
| | | | 310/68 C |
| 2021/0364364 A1 * | 11/2021 | Akaba | ...................... G01K 7/16 |
| 2022/0337116 A1 * | 10/2022 | Dang | ..................... H02K 15/12 |

FOREIGN PATENT DOCUMENTS

| | | | | |
|---|---|---|---|---|
| DE | 202016103030 | U1 | 10/2017 | |
| DE | 102017210401 | A1 | 12/2018 | |
| DE | 102018119831 | * | 2/2020 | ............. H02K 11/25 |
| EP | 3190688 | A1 | 7/2017 | |
| FR | 2995741 | A1 | 3/2014 | |
| FR | 3037738 | A1 | 12/2016 | |
| FR | 3046505 | A1 | 7/2017 | |
| JP | 201257980 | A | 3/2012 | |
| JP | 2016123155 | A * | 7/2016 | ............. H02K 11/25 |
| JP | 2016129446 | A * | 7/2016 | ............. H02K 11/25 |
| JP | 2017022820 | A * | 1/2017 | ............. H02K 11/25 |
| JP | 2018186608 | A | 11/2018 | |
| JP | 2019110676 | A * | 7/2019 | ............. H02K 11/25 |
| WO | WO-2017078455 | A1 * | 5/2017 | ........... B62D 5/0403 |
| WO | WO-2020026394 | A1 * | 2/2020 | ............... G01K 1/14 |

OTHER PUBLICATIONS

International Search Report and Written Opinion for PCT/EP2020/055571 mailed Jun. 30, 2020 (15 pages; with English translation).

* cited by examiner

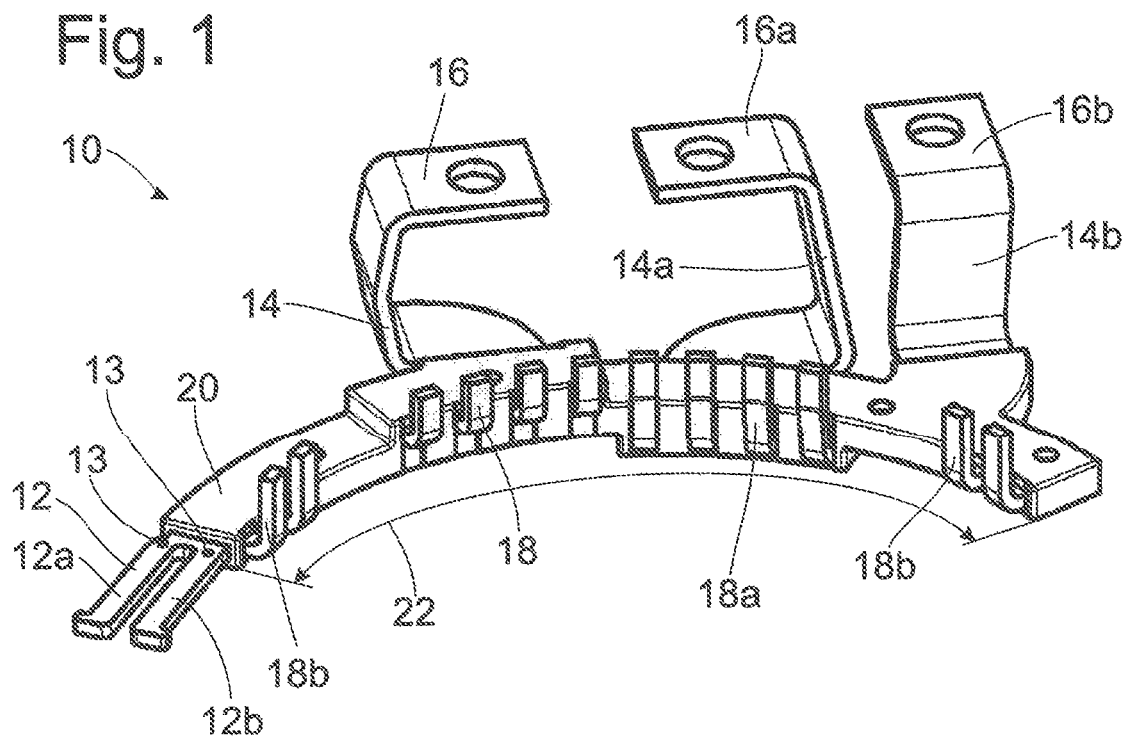
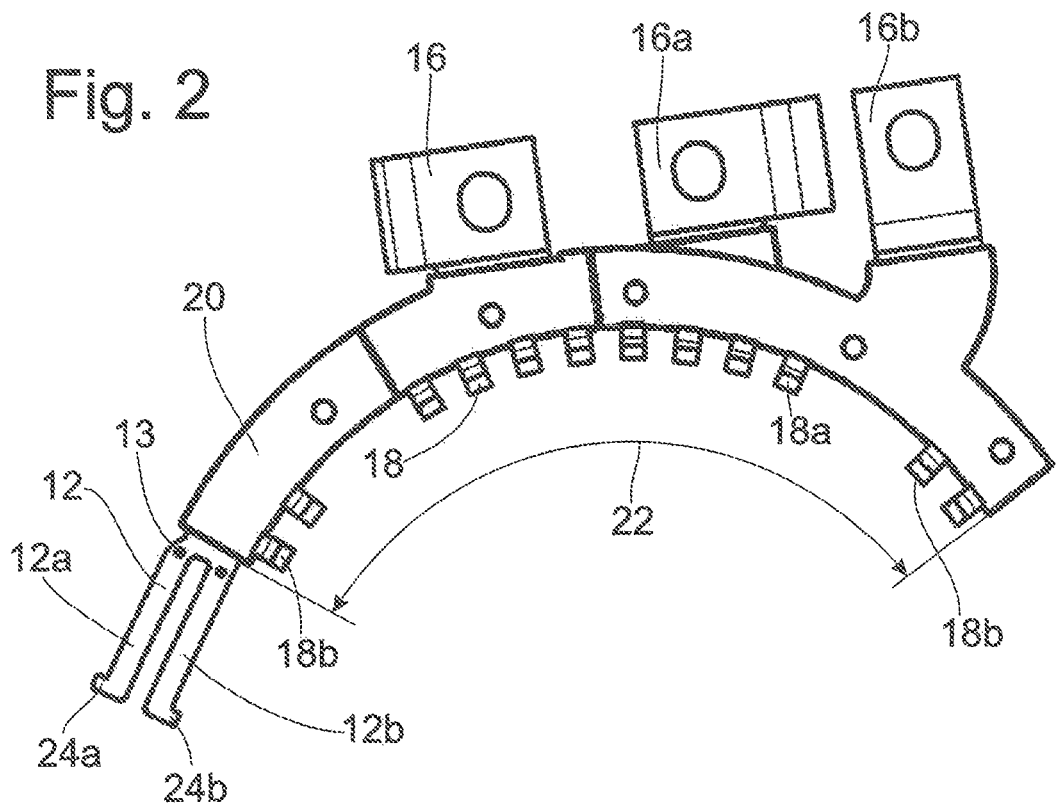

WIRING CONFIGURATION FOR A STATOR, TEMPERATURE SENSOR DEVICE, AND SYSTEM FOR DETECTING A TEMPERATURE

CROSS-REFERENCE TO RELATED APPLICATIONS

This application is a national stage of International Application No. PCT/EP2020/055571, filed Mar. 3, 2020, the disclosure of which is incorporated herein by reference in its entirety, and which claimed priority to German Patent Application No. 102019202912.4, filed Mar. 5, 2019, the disclosure of which is incorporated herein by reference in its entirety.

TECHNICAL FIELD

The present disclosure relates to an interconnection arrangement for a stator of an electrical machine and to a temperature sensor device for the interconnection arrangement. One aspect relates to a system for detecting a temperature at a stator as well as to a stator of an electrical machine with an interconnection arrangement on which a temperature sensor is arranged.

BACKGROUND

According to known designs, stator coils or stator windings of an electrical machine may be brought into contact by an interconnection arrangement with external terminal points or power terminals, in order to apply a respective voltage to individual phases of the winding by an electrical circuit or power electronics.

Known interconnection arrangements have connector rings, for example, which are accommodated within a carrier. The carrier may simultaneously bring about positioning of the rings and electrical insulation of the connector rings from one another. The connector rings are fixed firmly in the carrier.

Connector rings have winding terminals, for example, for connecting the interconnection arrangement to the stator winding and external terminals. Via the external terminals, the individual stator windings are each placed in contact with an external terminal, for example with power cables of the power electronics.

During operation of the electrical machine, heating of the stator may arise. It is necessary, for example, to detect a current temperature value at the stator or the interconnection arrangement during operation. A temperature sensor may for example be positioned directly on a coil conductor of the stator winding or on a connecting conductor of the interconnection arrangement.

JP 2012 057 980 A discloses a temperature detector with a temperature sensor. The temperature sensor is arranged on a linear conductor, which forms a coil of an electrical machine, in order to detect a temperature of the linear conductor.

A temperature sensor is known from DE 20 2016 103 030 U1 which is secured to a current contact. The temperature sensor is secured with a heat-shrinkable sleeve and the arrangement is arranged in a plug housing.

U.S. Pat. No. 2,013,270 973 A1 discloses a rotary electric machine. The electric machine contains a winding conductor and a neutral line, which is in contact with the winding. The neutral line is wound around a temperature sensor, in order to detect the temperature of the neutral line. The neutral line and temperature sensor are surrounded by a cast housing.

In known designs, securing of the temperature sensor is provided for example in a region of a coil conductor which is used to produce electrical contact with adjacent coil conductors. This may result in the disadvantage that the replaceability of the sensor (for example in the event of failure of the sensor) may also lead to damage to the electrical contacting point.

Temperature sensors may for example be secured by injection-molded encapsulation, in order to enable durable fixing of the temperature sensor. In temperature sensors which are secured by injection-molded encapsulation, however, demounting of the temperature sensor for example brings about an increased risk of damage to a stator part to which the temperature sensor is attached. Likewise, soldered joints between stator and temperature sensor may in particular lead more readily to damage or indeed to undesired short circuits on removal of the temperature sensor.

What is needed is to provide a design which allows temperature detection at an interconnection arrangement for a stator and simple replacement of a temperature sensor.

SUMMARY

An interconnection arrangement for a stator of an electrical machine is provided according to the disclosure. The interconnection arrangement comprises at least one busbar, which forms at least one segment of a connector ring with an external terminal and a winding terminal. A winding of the stator may be connected to the winding terminal. Power electronics may for example be connected to the external terminal, in order to drive or operate the stator winding. In such an exemplary arrangement, contact elements of the external terminal and of the winding terminal are arranged in an interconnection region which is formed in the circumferential direction of the connector ring segment. A current path of the interconnection arrangement runs through the interconnection region from external terminal to winding terminal.

Furthermore, the interconnection arrangement has a receiving element for a sensor arranged outside the interconnection region on the connector ring segment. In such an exemplary arrangement, the receiving element is coupled at least thermally to the connector ring segment or the busbar within the interconnection region. In one exemplary arrangement, provision is made for the receiving element and the connector ring segment to be formed in one piece. An arrangement of the receiving element outside the interconnection region may be an arrangement in the circumferential direction, in the axial direction or in the radial direction outside the interconnection region.

In one exemplary arrangement, the receiving element may be an extension of the busbar or of a connecting conductor of the interconnection arrangement, which projects beyond the interconnection region and/or out of a housing surrounding the interconnection region, or which projects from the interconnection region in the form of a branch. For example, the receiving element is formed by a bar onto which the sensor, in particular a temperature sensor, can be slipped or pushed. Due to thermal coupling, a temperature of the receiving element may be approximated to a temperature at the current path of the interconnection arrangement or correspond substantially thereto. Thus, the temperature of the stator with the interconnection arrangement can be measured or detected at the receiving element. The receiving element may for example be directly connected to the interconnection region or arranged close to the interconnection region.

In one exemplary arrangement, it is advantageous, for example, for the receiving element to lie outside the current path. Thus, a temperature sensor may for example be mounted or replaced without the risk of damage to contact points of the current path. In one exemplary arrangement, a temperature sensor may be simply attached to the receiving element as a result of a protruding shape of the receiving element, which is freely accessible at least from one side, such that replacement of the temperature sensor is also made straightforwardly possible.

The busbar of the interconnection arrangement is formed for example from an electrically conductive material, such as metal. The busbar may for example comprise copper, a copper alloy, aluminum or an aluminum alloy. A high level of thermal coupling or thermal conductivity, for example, may in this way advantageously be achieved between the interconnection region and the receiving element and/or the receiving element may at the same time be simply and inexpensively provided. For example, in one exemplary arrangement, the receiving element may thus also be coupled electrically with the interconnection region but, thanks to electrical no-load operation at the end of the receiving element, may be substantially electroless (for example with a current density of less than 10% of a current density within the current path during operation of the interconnection arrangement).

The proposed design thus exhibits, for example, securing of the temperature sensor to a region of the interconnection arrangement not provided for interconnection. This may be achieved by securing the temperature sensor to the extension protruding specifically for connection purposes.

The receiving element, for example, extends in a circumferential direction of the connector ring segment. Alternatively or in addition, the receiving element may extend in an axial and/or radial direction of the connector ring segment. It is thereby possible to form the receiving element in such a way that, for example, in a mounted state of the interconnection arrangement, access to the receiving element is obtained in order to mount a temperature sensor straightforwardly thereon. One of the connecting conductors, for example the busbar, thus consequently has at least one extension extending in the circumferential, radial and/or axial direction and/or at a given angle away from the interconnection region. A cross-section of the extension may correspond to the cross-section of a coil conductor (for example a stator winding), for instance to map better the temperature prevailing at the coil conductors.

For example, the receiving element comprises two receiving bars. It is moreover possible for a plurality of receiving elements or extensions to be provided on a connecting conductor or the busbar, in order for example to be able to use a plurality of temperature sensors for temperature measurement. For example, a temperature sensor may be mounted on each of the two receiving bars to enable redundant temperature detection.

The width of the extension or of a receiving bar may correspond to the width of the temperature sensor provided, in order to orient this in optimized manner and so connect it thermal reproducibly to the receiving element. This enables particularly simple mounting of the temperature sensor.

The receiving element for example comprises at least one retaining projection at its end remote from the interconnection region. The retaining projection may for example extend in the radial or axial direction. The retaining projection may bring about improved positioning and/or increased stability of the securing of the temperature sensor. For example, the contour of the receiving element has at its free end a shoulder which, depending on the connection variant provided for the temperature sensor, serves in axial fastening and/or axial orientation of a securing element, for example a sensor housing. In one exemplary arrangement, the receiving element may for example furthermore comprise at least one notch, to which for instance a clip-on housing of a temperature sensor may be secured.

A housing of the interconnection arrangement, which delimits the receiving element at an end facing the interconnection region, for example forms a limit stop for a slip-on temperature sensor device. In this way, mounting of the temperature sensor device on the interconnection arrangement may be simplified, since the temperature sensor may be slipped on as far as the limit stop, in order to be positioned as intended. In one exemplary arrangement, the connecting conductors (for example bus bars, which form respective connector ring segments) of the interconnection arrangement may for example be insulated from one another by a potting compound, or for example, may be partially or completely encapsulated in injection-molded plastics. The extension outside the interconnection arrangement may however, be a region free of the potting compound or injection-molded encapsulation, such that the sensor head may be attached directly on the surface of the extension. The casting compound may thus provide the receiving limit stop for simple adjustment of the temperature sensor.

One aspect of the disclosure relates to a temperature sensor device for slipping onto a receiving element of an interconnection arrangement, as described above for example. A temperature sensor of the temperature sensor device is in this case arranged in a sensor housing comprising a hard component and/or a soft component. Furthermore, the sensor housing has an opening for receiving the receiving element and the temperature sensor is arranged on a surface inside the opening. As a result, the temperature sensor is, for example, automatically positioned in predefined, reproducible and/or standardized contact with the receiving element for example when the temperature sensor device is in a slipped-on state.

In one exemplary arrangement, the housing for example is formed at least in part from a hard component, for instance a thermoplastic. The housing may have spring elements for fixing the housing to the receiving element. The spring elements may for example be secured in previously mentioned notches in the receiving element.

Further options for securing the temperature sensor to the receiving element are the use of a soft component housing, which comprises an elastomer for example. In this way, a flexible housing may be provided, which enables stable securing of the temperature sensor. The housing material may in particular have high temperature resistance and/or a predetermined modulus of elasticity. Alternatively or in addition, a heat-shrinkable sleeve may be used, to secure the temperature sensor to the receiving element. Owing to the bar-shaped configuration of the receiving element with a free end, the temperature sensor may be simply replaced and resecured by a heat-shrinkable sleeve, without the need to isolate electrical contacts.

One aspect of the disclosure relates to a system for detecting a temperature at a stator. The system comprises an interconnection arrangement with a receiving element arranged outside an interconnection region of the interconnection arrangement. The system moreover has a temperature sensor, wherein the temperature sensor is arranged in contact with the receiving element. In other words, temperature sensor and receiving element are thermally coupled. In one exemplary arrangement, the system comprises an above-described interconnection arrangement and an above-described temperature sensor device. The temperature sensor is secured to the receiving element for example by a plastics housing removable from the receiving element or by a heat-shrinkable sleeve.

In one exemplary arrangement, the interconnection arrangement may have three connecting conductors or connector ring segments, which are arranged in the axial or in the radial direction relative to the stator coils, so as to be connected therewith. Each connecting conductor has contact points via which the coil conductors can be welded to the connecting conductors. All the contact points of the interconnection arrangement define the interconnection region, for example. For example, in one exemplary arrangement, one of the three connecting conductors has a receiving element for the temperature sensor.

One aspect of the disclosure relates to a stator for an electric machine. To create contact between a winding of the stator (stator winding) and a switching apparatus or power electronics for supplying power to the stator winding, the stator has an interconnection arrangement according to an interconnection arrangement described above or below. Furthermore, the disclosure relates to an electric machine with a stator comprising a corresponding interconnection arrangement, which is placed in contact with power terminals for example.

The temperature may for example be measured at various points on the stator. To measure the temperature, the temperature sensor may for example be secured to the axial end face of the winding (e.g. concentrated winding or pull-in winding) by a holder, and/or in an opening between two coils or winding coils.

Further developments of the system, the stator and the electrical machine relate to features of further developments as have already been described in conjunction with the interconnection arrangement or the temperature sensor which can be slipped on. The description is therefore not repeated and the corresponding features are deemed to be disclosed also in relation to the system, the stator and the electrical machine. Further aspects of the disclosure are also disclosed in relation to the following examples.

BRIEF DESCRIPTION OF THE DRAWINGS

A number of examples of apparatuses are explained in greater detail below by way of example with reference to the appended figures, in which:

FIG. 1 shows an exemplary arrangement of an interconnection arrangement with a receiving element for a temperature sensor;

FIG. 2 is a plan view of the interconnection arrangement with receiving element;

DETAILED DESCRIPTION

Figure 3:
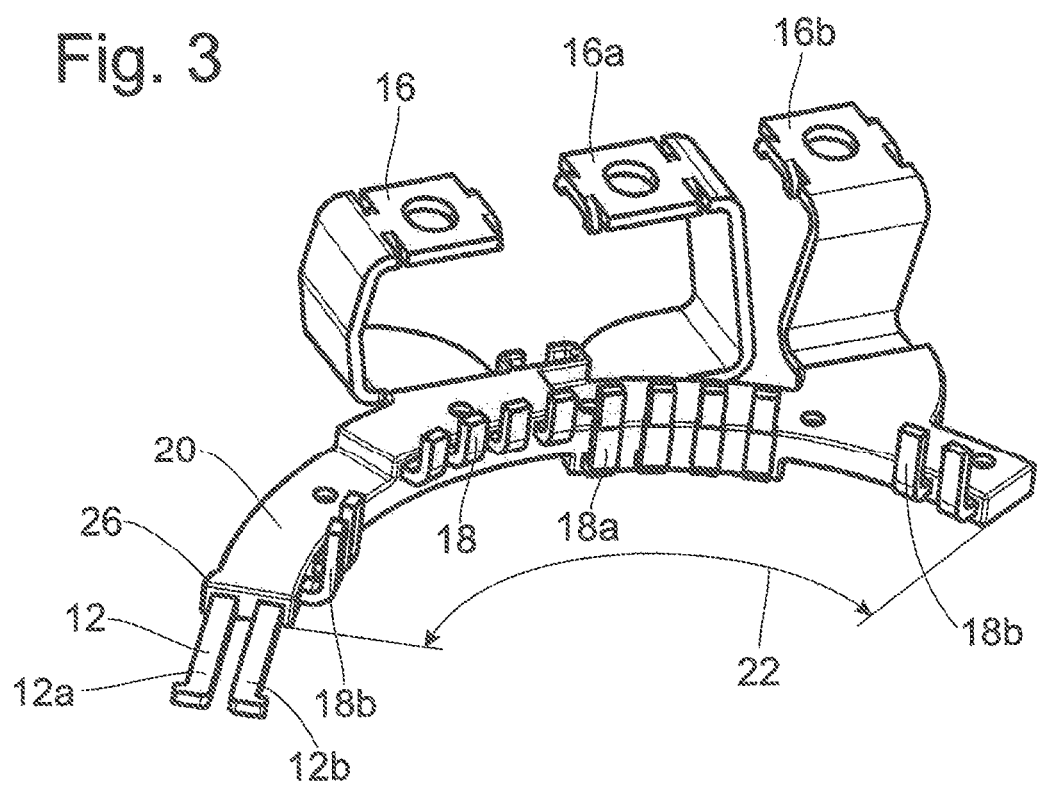
FIG. 3 shows an exemplary embodiment of an interconnection arrangement with a limited receiving element for adjusting a temperature sensor.

FIG. 1 shows an exemplary arrangement of an interconnection arrangement 10 with a receiving element 12 for securing a temperature sensor. The interconnection arrangement 10 has three busbars 14, 14a, 14b, each of which form a connector ring segment with an external terminal 16, 16a, 16b and a winding terminal 18, 18a, 18b. The winding terminals 18, 18a, 18b each comprise four mutually isolated terminal lugs, with which in each case one turn of a stator winding can be placed in contact. The respective connector ring segments are accommodated in a housing 20, which fixes the connector ring segments and insulates them electrically from one another. The external terminals 16, 16a, 16b and the winding terminals 18, 18a, 18b are arranged in an interconnection region 22 of the interconnection arrangement 10. The interconnection region 22 is delimited circumferentially. The busbars 14, 14a, 14b are, for example, surrounded by the housing 20 within the interconnection region 22.

The receiving element 12 is arranged on one of the busbars 14, 14a, 14b outside the interconnection region 22. The housing 20 for example does not surround the receiving element 12. The receiving element 12 shown in the exemplary arrangement is an extension of busbar 14b. The receiving element 12 is thus formed in a unit with the busbar 14b and is thus also electrically conductive. In this case, a current path extends from the external terminal 16b of the busbar 14b to the coil terminal or winding terminal 18b through the interconnection region 22, whereas no current path is formed within the receiving element 12. Because the receiving element 12 and busbar 14b of the interconnection arrangement 10 are configured in one piece, a good thermal connection is obtained between the receiving element 12 and the busbar 14b. For example, the busbar 14b comprises copper or aluminum, which provide not only electrical conductivity but also good thermal conductivity. This makes it possible for a temperature at the receiving element 12 of the busbar 14b substantially to correspond to a temperature of the connector ring segment of the busbar 14b within the interconnection region 22. A temperature sensor attached to the receiving element 12 may thus detect with a high level of accuracy a temperature at the contacting region between external terminals and stator winding.

The receiving element 12 of the exemplary embodiment is configured with two portions, a first circumferentially extending bar 12a and a second bar 12b accordingly being provided. This makes it possible, for example, to attach two separate temperature sensors to the receiving element 12. Furthermore, in one exemplary arrangement, marker points 13 are provided on the receiving element 12 on a side facing the housing 20. The marker points 13 may indicate to what extent a housing of a temperature sensor to be attached to the receiving element 12 may, for example, be pushed in the direction of the housing 20 of the interconnection arrangement on mounting in order to achieve optimum positioning of the temperature sensor.

The external terminals 16, 16a, 16b comprise securing arrangements to which, for example, power electronics busbars or a power supply for the stator winding may be secured, such as, for example, by a screw fastening or plug-in connector. Turn ends of the stator winding may for example be secured non-detachably to the terminal lugs of the winding terminal (for example by welded joints).

FIG. 2 is a plan view of the interconnection arrangement 10 with the receiving element 12. The figure reveals shoulders or projections 24a, 24b of the respective bars 12a, 12b formed on the receiving element 12 in the exemplary arrangement, the projections 24a, 24b in the radial direction. The projections 24a, 24b may be provided for fastening a push-on temperature sensor or for aligning the push-on temperature sensor.

Figure 4:
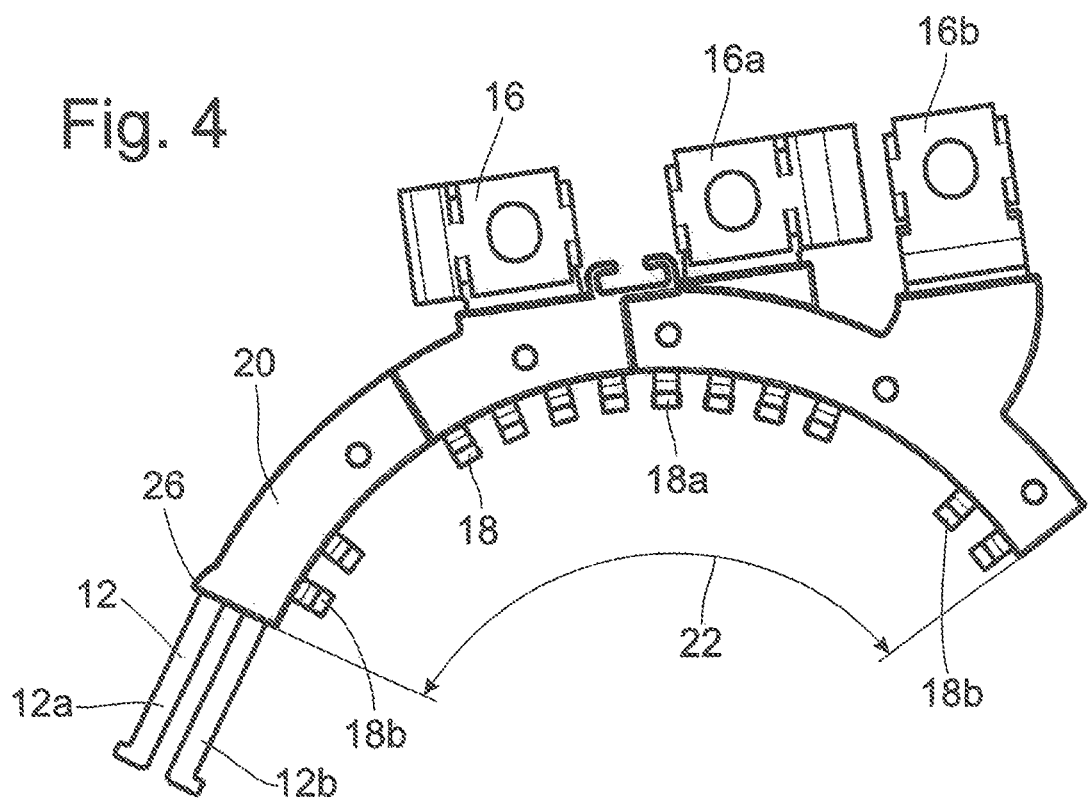
FIG. 4 is a plan view of the interconnection arrangement with limited receiving element.

FIG. 3 shows an example of the interconnection arrangement 10 with a receiving element 12 comprising two bars 12a, 12b protruding separately from the housing 20 of the interconnection arrangement 10. According to the example shown in FIG. 3 and FIG. 4, the housing 20 of the interconnection arrangement is widened circumferentially at the receiving element 12. The widened portion provides a housing limit stop 26, the position of which may correspond to a position of the marker points 13 of the previous example. The provision of the housing limit stop 26 makes it possible to simplify the mounting of a temperature sensor on the receiving element 12. A temperature sensor may, for example, be pushed onto the receiving element 12 (or onto a respective bar 12a, 12b), until a housing of the temperature sensor strikes against the limit stop 26.

Figure 5:
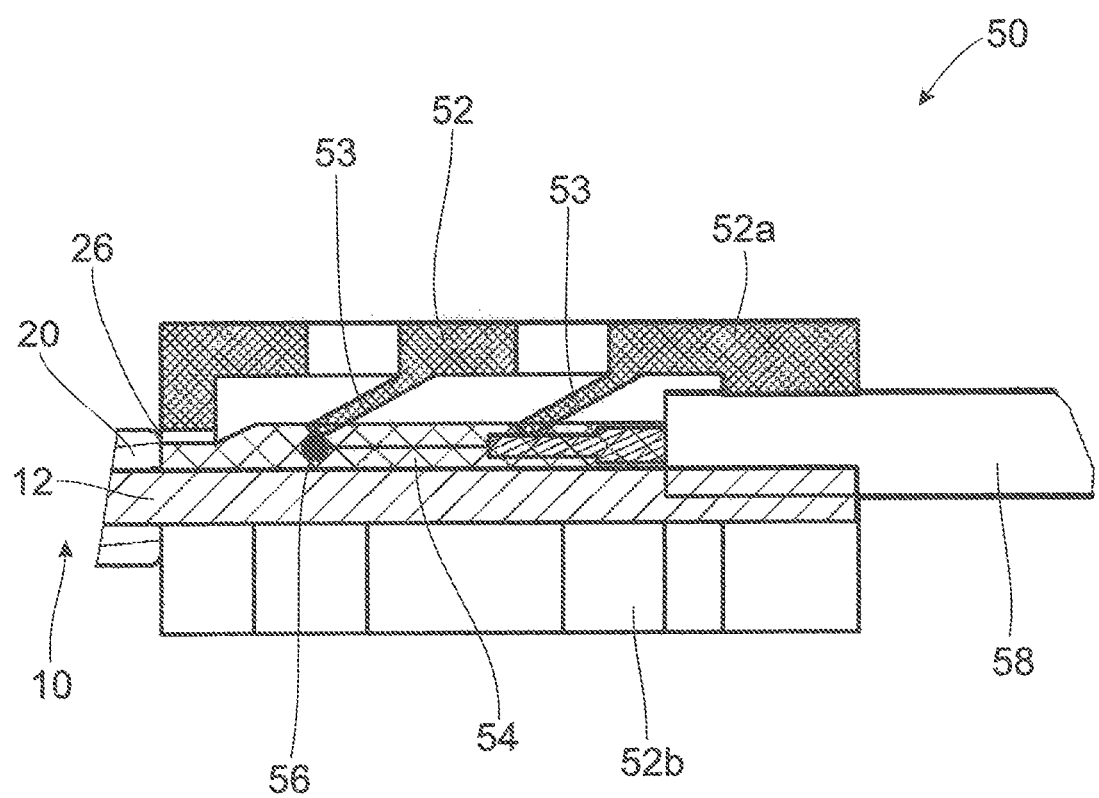
FIG. 5 shows an exemplary arrangement of a temperature sensor in a housing capable of being slipped on and comprising a hard component.

FIG. 5 shows an exemplary arrangement of a temperature sensor device 50 in a housing 52 comprising a hard component. The temperature sensor device 50 shown in FIG. 5 is pushed onto a receiving element 12 of an interconnection arrangement 10 (cf. for example FIGS. 1 to 4). In the process, the housing 52 of the temperature sensor device 50 strikes against a housing limit stop 26 of the housing 20 of the interconnection arrangement 10. Within the housing 52 of the temperature sensor device 50, a temperature sensor 54 is arranged with a sensor head or a sensor element 56. The exemplary temperature sensor 54 shown is, for example, a NTC (negative temperature coefficient) sensor.

The receiving element 12 is accommodated in an opening in the housing 52 adapted geometrically to the receiving element 12. The temperature sensor 54 forms an inner surface of the opening, such that the temperature sensor 54 is in direct contact with the receiving element 12. On a side facing the housing 20 of the interconnection arrangement 10, the housing 52 has a cable opening for guiding out a cable 58 of the temperature sensor 54, which may for example be connected to a device for temperature evaluation. With the assistance of the temperature sensor device 50 shown in FIG. 5, undoable fixing of the temperature sensor 54 by a plastics clip is shown, here of the housing 52 configured as a plastics clip. In one exemplary arrangement, the plastics clip may comprise, at least in part, a thermoplastic.

The plastics clip 52 or the housing 52 may be C- or U-shaped in configuration in a plane perpendicular to the illustration of FIG. 5 and have a base region 52a and two legs 52b projecting perpendicular therefrom, of which just one is visible in the sectional representation of FIG. 5.

Between the two legs 52b a slot is provided, via which the temperature sensor 54 may be introduced from a side opposite the base region 52. Openings may be formed on the receiving element 12 or projection of a connecting conductor or busbar (for example on the receiving element 12), into which the legs 52b of the plastics clip 52 may be inserted. Spring elements 53 in the form of spring tongues 53 are formed on the base region 52a via which the plastics clip 52 and the temperature sensor 54 accommodated therein are fixed to the receiving element 12.

Figure 6:
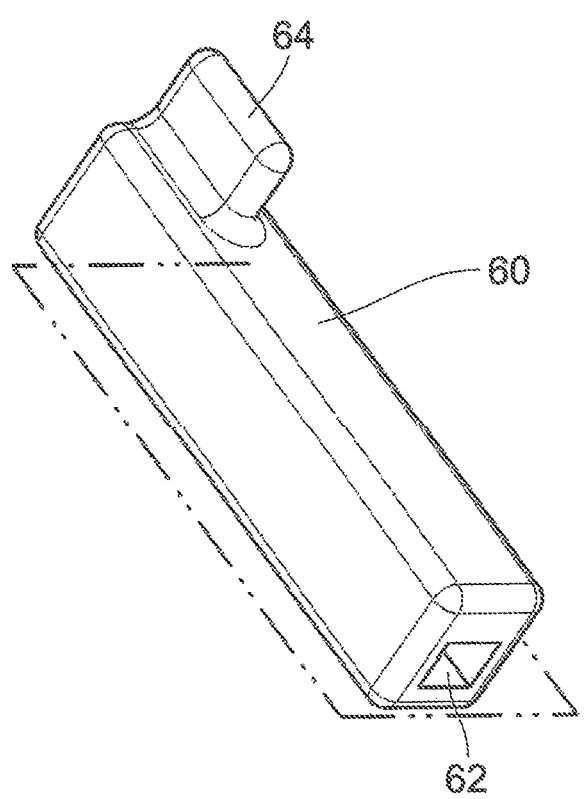
FIG. 6 shows an exemplary embodiment of a temperature sensor in a housing capable of being slipped on and comprising a soft component.

FIG. 6 shows an alternative possibility for connecting the temperature sensor 54 to the receiving element 12 of the connecting conductor. In this exemplary arrangement, a housing 60 is provided as the housing for accommodating the temperature sensor 54 which comprises a flexible plastics element (for example a soft component), for example an elastomer. In one exemplary arrangement, the housing 60 is produced from silicone, for example.

In the exemplary arrangement, the housing 60 comprising the soft component is fundamentally cuboidal in configuration, for example, and has an opening 62, the cross-section and/or length of which is adapted to a receiving element of an interconnection arrangement. The cross-section of the opening 62 is for example smaller than a cross-section of the receiving element 12, such that on insertion of the extension 12 into the opening 62 the elastomer is put under tension, which fixes the housing 60 and the temperature sensor 54 to the receiving element 12. A bar 12a of the receiving element 12 may for example be accommodated in the opening 62. The housing 60 has a shaped portion 64, for example, which may simplify the mounting or removal of the housing 60 on or from an extension. The plastics element may alternatively be of cylindrical configuration.

Figure 7:
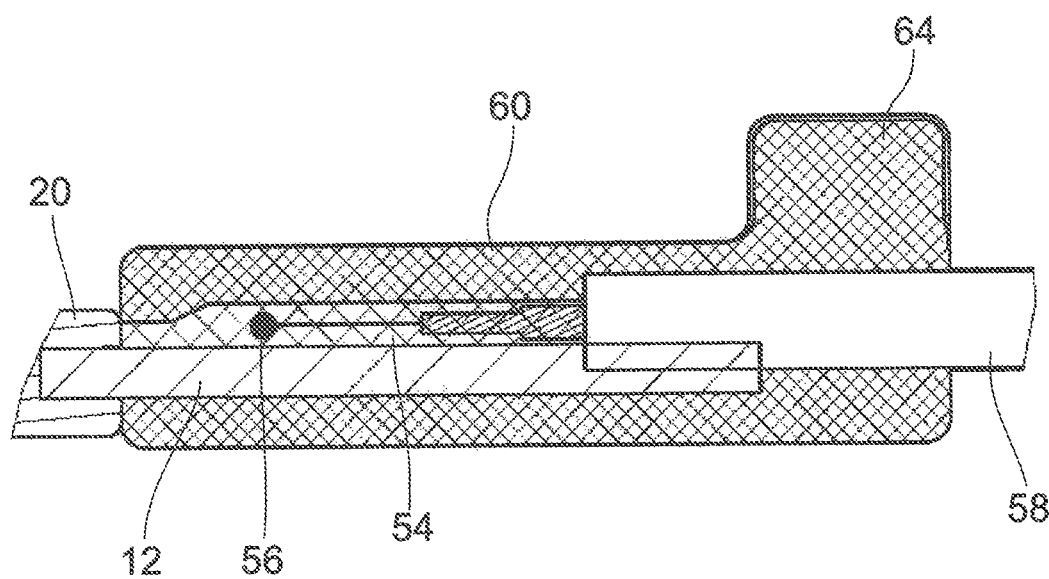
FIG. 7 is a sectional view of the temperature sensor in the housing capable of being slipped on and comprising the soft component.

FIG. 7 is a sectional view of the housing 60 with mounted temperature sensor 54 on an extension or receiving element 12. On one end face (for example the rear) the plastics element has an opening for introduction of the temperature sensor 54, through which the cable 58 of the temperature sensor 54 may for example be guided. On the other, opposing end face, the plastics element is of open configuration, for example (owing to the opening 62), in order to push the plastics element together with the temperature sensor 54 already accommodated therein onto the receiving element 12. The dimensioning of the resilient plastics element is in this case selected, for example, such that in the installed state mechanical pretensioning prevails, such that the temperature sensor 54 is pressed against the receiving element 12. The leg of the plastics element on which the temperature sensor 54 rests has a retaining projection, for example, for supporting the cable 58 of the temperature sensor 54.

Figure 8:
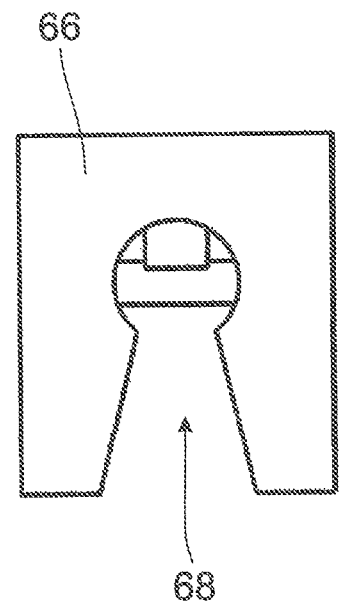
FIG. 8 is a schematic view of the rear of a housing for a temperature sensor.

FIG. 8 shows a schematic view of a rear 66 of a housing (for example comprising a thermoplastic or an elastomer) for a temperature sensor 54 for pushing onto a receiving element 12. The figure reveals an opening 68 through which the temperature sensor 54 may for example be introduced into the housing and which may moreover for example fix a cable 58 of the temperature sensor 54, such that, if mechanical tensile forces are applied to the cable, the temperature sensor 54 does not change position relative to the receiving element 12.

Figure 9:
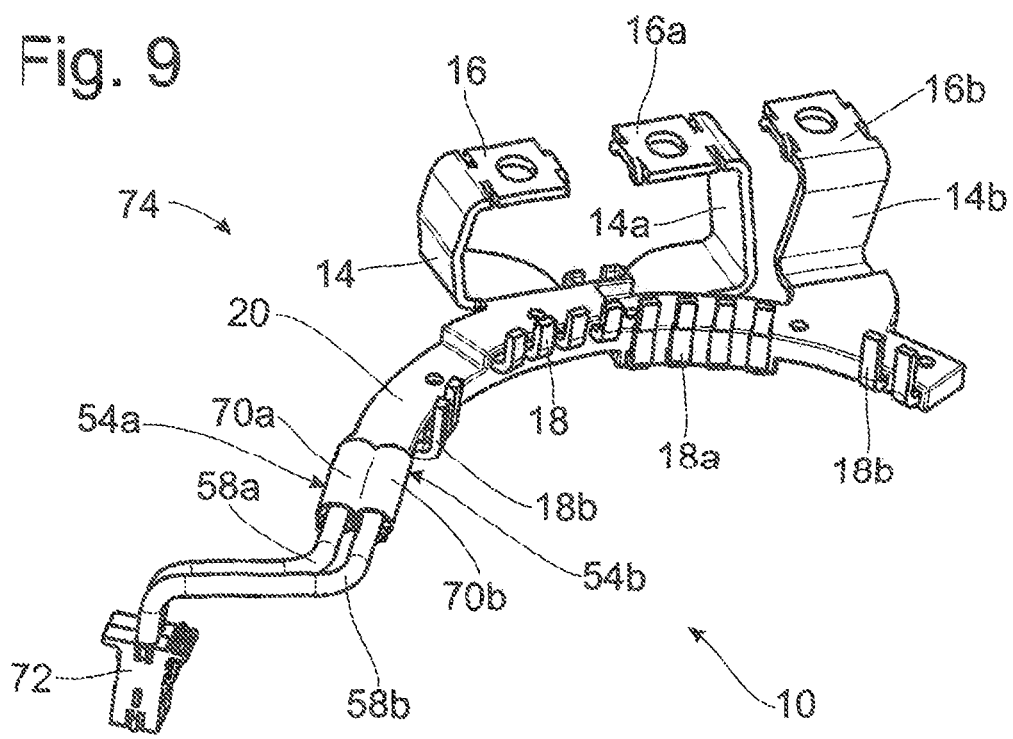
FIG. 9 shows an exemplary arrangement of an interconnection arrangement with a receiving element and attached temperature sensor.

FIG. 9 shows an exemplary arrangement of an interconnection arrangement 10 with temperature sensors 54a, b attached thereto. The temperature sensors 54a, b are here secured to a receiving element 12 of the interconnection arrangement 10 by a heat-shrinkable sleeve. A first temperature sensor 54a is secured to a first bar of the receiving element 12 by a first heat-shrinkable sleeve 70a. A second temperature sensor 54b is secured to a second bar of the receiving element 12 by a second heat-shrinkable sleeve 70b. The use of a heat-shrinkable sleeve may improve contact of the respective temperature sensor 54a, b on the respective bar of the receiving element 12.

Respective connecting cables 58a, 58b of the temperature sensors 54a, b are guided out of the heat-shrinkable sleeves 70a, 70b and connected with a common plug-in element 72 (also possible, for example, in arrangements with a different sensor housing). The temperature sensors 54a, b may thereby, for example, be connected simply to evaluation electronics by plug-in connection.

Figure 10:
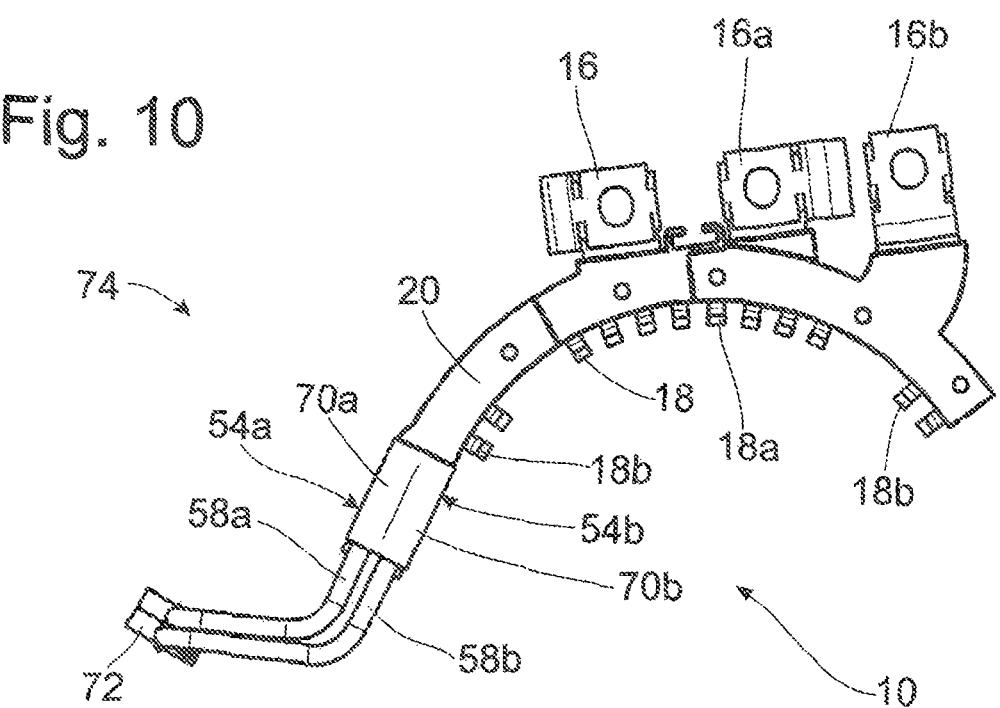
FIG. 10 is a plan view of the interconnection arrangement with receiving element and attached temperature sensor.

FIG. 10 shows the exemplary arrangement according to FIG. 9 in plan view. The interconnection arrangement with the mounted temperature sensors 54a, b provides a system 74 for detecting a temperature in which it is particularly simple to exchange one or both temperature sensors 54a, b. In this respect, in the case of a defective temperature sensor, the respective heat-shrinkable sleeve 70a may for example be undone and said temperature sensor replaced. In this respect, it is not necessary to perform work in the interconnection region of the interconnection arrangement 10, such that even in the case of winding contacts formed in relation to a stator winding (cf. FIG. 12), the risk of damage to respective contact points is minimized.

Figure 11:
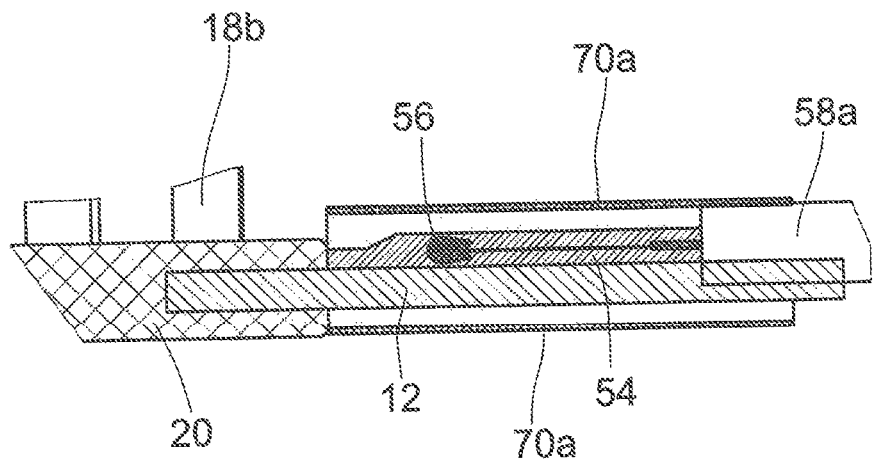
FIG. 11 is a sectional view of the receiving element with attached temperature sensor.

FIG. 11 is a sectional view of securing of the temperature sensor 54a with a sensor element 56 to the receiving element 12 by the heat-shrinkable sleeve 70a. The receiving element 12 projects out of the housing 20 of the interconnection arrangement 10. The shrunk heat-shrinkable sleeve 70a here presses the temperature sensor 54a onto the receiving element 12 and at the same time fixes the sensor cable 58a of the temperature sensor 54 in place.

When the temperature sensor 54a is secured using the heat-shrinkable sleeve, the temperature sensor 54a is attached on the extension or receiving element 12 and enveloped by the heat-shrinkable sleeve 70a together with the extension 12. The hose may for example be shrunk using a hot air gun, so securing the sensor head in optimized manner to the receiving element 12. The inner surface of the heat-shrinkable sleeve 70a may in addition be configured to be self-adhesive, in order to ensure additional fixing and/or a simpler mounting. Injection-molded encapsulation of the interconnection arrangement 10 (for example the housing 20) may define a stop point for positioning of the heat-shrinkable sleeve on the receiving element 12.

Figure 12:
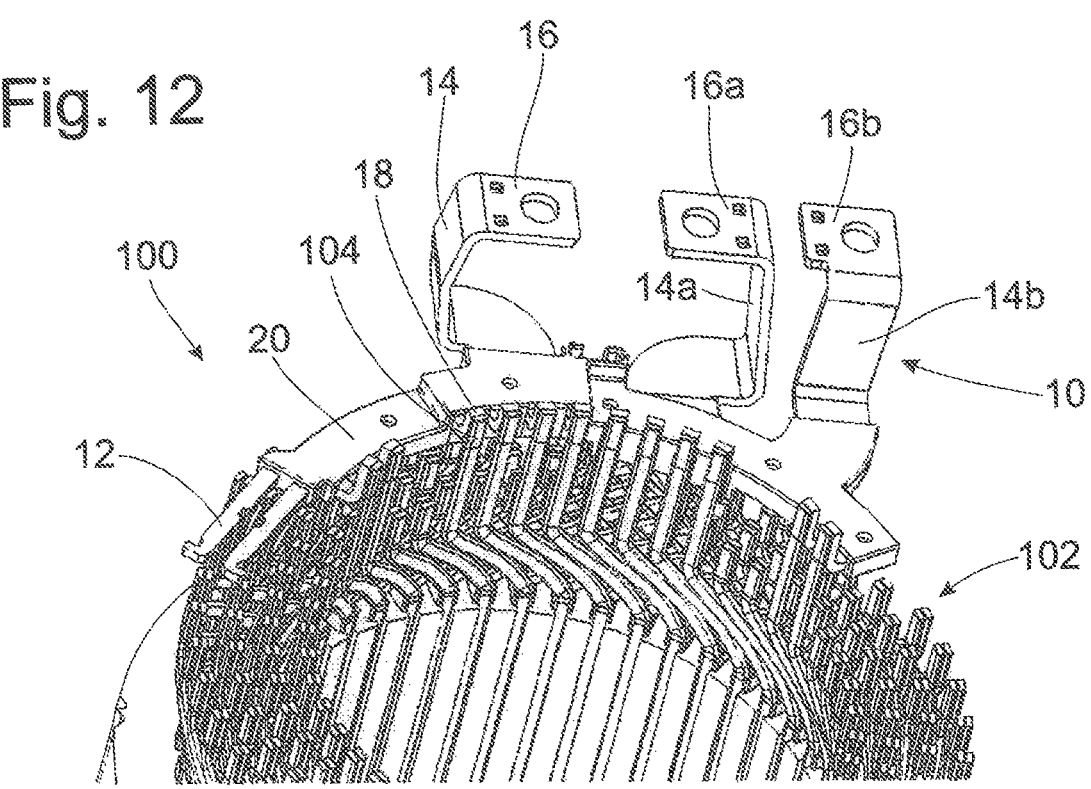
FIG. 12 shows an exemplary embodiment of a stator with an interconnection arrangement with receiving element.

FIG. 12 shows a stator 100 with an interconnection arrangement 10. The stator has a stator winding 102 with turn ends 104 which are electrically contacted at respective terminal lugs of the winding terminals 18, 18a, 18b of the respective busbars of the interconnection arrangement 10. In this case, it is apparent in particular that the contacting between interconnection arrangement 10 and stator winding 102 is embodied solely in the interconnection region 22. On the other hand, in the region of the receiving element 12 no contact with the stator winding 102 is formed, such that at the exposed extension 12 a temperature sensor device 50 may be attached and replaced for straightforwardly measuring a temperature of the interconnection arrangement 10 or of the stator 100.

The proposed arrangement for securing the temperature sensor may for example also simplify initial mounting of the temperature sensor. In this case, securing of the temperature sensor may take place for instance on mounting of the stator, as a step following interconnection and impregnation of the stator. Various options are proposed for fixing the temperature sensor on the receiving element or the extension.

The present disclosure proposes concepts for securing a temperature sensor to an extension or receiving element of the connecting conductor provided outside the interconnection region. It is thereby straightforwardly possible, for example, to separate the temperature sensor from the extension if replacement is needed, wherein the risk, for example, of damage to the overall interconnection arrangement or in particular the electrical contact points is minimized.

The invention claimed is:

1. An interconnection arrangement for a stator of an electrical machine, the interconnection arrangement comprising: at least one busbar, which forms at least one segment of a connector ring with an external terminal and a winding terminal, wherein contact elements of the external terminal and of the winding terminal are arranged in an interconnection region formed in a circumferential direction of the connector ring segment, through which region a current path of the interconnection arrangement extends from the external terminal to the winding terminal; and a receiving element for a temperature sensor arranged outside the interconnection region on the connector ring segment, wherein the receiving element is coupled at least thermally with the connector ring segment; and further comprising a housing of the interconnection arrangement which delimits the receiving element at an end remote from the interconnection region, the housing forming a limit stop for a slip-on temperature sensor device.

2. The interconnection arrangement as claimed in claim 1, wherein the receiving element extends in the circumferential direction of the connector ring segment.

3. The interconnection arrangement as claimed in claim 1, wherein the receiving element extends in an axial and/or radial direction of the connector ring segment.

4. The interconnection arrangement as claimed in claim 1, wherein the receiving element has two receiving bars.

5. The interconnection arrangement of claim 4, wherein the receiving element has at least a retaining projection on each end remote from the interconnection region.

6. The interconnection arrangement of claim 5, wherein the receiving bars-extend in the axial direction and each of the at least retaining projections extend in a radial direction.

7. The interconnection arrangement of claim 4, wherein the receiving bars are connected together outside of a housing.

8. The interconnection arrangement as claimed in claim 1, wherein the receiving element has at least one retaining projection at its end remote from the interconnection region.

9. The interconnection arrangement of claim 1, wherein the receiving element has at least one marker point to indicate to what extent a housing of a temperature sensor to be attached to the receiving element retaining projection may be pushed in the direction of a housing of the interconnection arrangement.

10. A system for detecting a temperature at a stator, the system comprising: an interconnection arrangement that comprises at least one busbar, which forms at least one segment of a connector ring with an external terminal and a winding terminal, the interconnection arrangement having a receiving element which is arranged outside an interconnection region of the interconnection arrangement; and a temperature sensor, wherein the temperature sensor is secured to the receiving element by a housing removable from the receiving element and wherein in the housing has a shaped portion that protrudes outwardly from a main body of the housing.

11. A system for detecting a temperature of a stator of claim 10, wherein a temperature sensor device is configured for slipping onto a receiving element of an interconnection arrangement, the temperature sensor device including the temperature sensor, wherein the temperature sensor is arranged in a sensor housing comprising a hard component and/or a soft component, wherein the sensor housing has an opening for accommodating the receiving element and the temperature sensor is arranged on a surface inside the opening.

12. The interconnection arrangement of claim 11, wherein the housing is formed at least in part of a soft component and the opening has a cross-section that is smaller than a cross-section of the receiving element such that on insertion of the extension into the opening, the soft component is put under tension to fix the housing and the temperature sensor to the receiving element.

13. The temperature sensor device as claimed in claim 11, wherein the housing is formed at least in part of a hard component and has spring elements for fixing the housing to the receiving element.

14. The system as claimed in claim 10, wherein the temperature sensor is secured to the receiving element by a heat-shrinkable sleeve.

15. The system as claimed in claim 10, wherein the temperature sensor includes a pair of temperature sensors which are secured to the receiving element by a pair of heat-shrinkable sleeves, such that a first temperature sensor is secured to a first bar of the receiving element by a first heat-shrinkable sleeve of the pair of heat-shrinkable sleeves, and a second temperature sensor is secured to a second bar of the receiving element by a second heat-shrinkable sleeve of the pair of heat-shrinkable sleeves.

16. The system as claimed in claim 10, wherein a rear of the housing includes an opening having a first section that extends from an edge of the housing and a second section that is in communication with the first section.

17. The system as claimed in claim 16, wherein the first section has a trapezoid shape such that a portion of the first section at the edge of the housing is wider than a portion adjacent the second section such that the first portion tapers inwardly to the second section.

* * * * *